(12) United States Patent
Rathbun et al.

(10) Patent No.: US 8,239,322 B2
(45) Date of Patent: Aug. 7, 2012

(54) METHOD OF POSTAL PAYMENT FOR SET OF CUSTOMIZED POSTAGE

(75) Inventors: Darryl T. Rathbun, Stratford, CT (US); Frederick W. Ryan, Jr., Oxford, CT (US)

(73) Assignee: Pitney Bowes Inc., Stamford, CT (US)

( * ) Notice: Subject to any disclaimer, the term of this patent is extended or adjusted under 35 U.S.C. 154(b) by 554 days.

(21) Appl. No.: 12/325,463

(22) Filed: Dec. 1, 2008

(65) Prior Publication Data

US 2009/0210341 A1  Aug. 20, 2009

Related U.S. Application Data

(60) Provisional application No. 61/030,037, filed on Feb. 20, 2008.

(51) Int. Cl.
 *G06Q 40/00* (2012.01)
(52) U.S. Cl. ........... 705/40; 705/401; 705/402; 705/404
(58) Field of Classification Search ............... 705/39, 705/401, 404, 402, 40
 See application file for complete search history.

(56) References Cited

U.S. PATENT DOCUMENTS

| 5,513,117 A | 4/1996 | Small |
| 6,450,537 B2 | 9/2002 | Norris |
| 7,127,434 B2 | 10/2006 | Burningham |
| 7,188,762 B2 | 3/2007 | Goade, Sr. et al. |
| 2002/0043566 A1 | 4/2002 | Goodman et al. |
| 2002/0073039 A1 | 6/2002 | Ogg et al. |
| 2002/0077973 A1 | 6/2002 | Ronchi et al. |
| 2002/0120530 A1 | 8/2002 | Sutton et al. |
| 2002/0149195 A1 | 10/2002 | Beasley |
| 2003/0065624 A1 | 4/2003 | James et al. |
| 2003/0225711 A1* | 12/2003 | Paping ............ 705/404 |
| 2004/0122779 A1 | 6/2004 | Stickler et al. |
| 2004/0128264 A1 | 7/2004 | Leung et al. |
| 2004/0195316 A1 | 10/2004 | Graves et al. |
| 2005/0065897 A1* | 3/2005 | Ryan et al. .......... 705/401 |
| 2005/0080751 A1 | 4/2005 | Burnlngham |
| 2005/0086167 A1 | 4/2005 | Brake, Jr. |
| 2005/0131841 A1 | 6/2005 | Demanowski |
| 2005/0133593 A1 | 6/2005 | Estakhri et al. |
| 2005/0167487 A1 | 8/2005 | Conlon et al. |
| 2005/0199706 A1 | 9/2005 | Beck et al. |
| 2005/0263587 A1 | 12/2005 | Martinez |
| 2006/0122947 A1 | 6/2006 | Poulin |
| 2006/0184451 A1 | 8/2006 | Ganesan et al. |
| 2006/0206436 A1 | 9/2006 | James et al. |
| 2006/0217996 A1 | 9/2006 | Graves |
| 2006/0259189 A1 | 11/2006 | Perlow et al. |
| 2007/0057045 A1 | 3/2007 | Beck et al. |
| 2007/0174213 A1* | 7/2007 | Whitehouse et al. ......... 705/401 |
| 2009/0070278 A1* | 3/2009 | Rosen ............. 705/407 |
| 2009/0106146 A1* | 4/2009 | Ferraro et al. ............. 705/40 |

FOREIGN PATENT DOCUMENTS

WO  WO03032110 A3  4/2003

* cited by examiner

*Primary Examiner* — Lindsay M Maguire
*Assistant Examiner* — Hao Fu
(74) *Attorney, Agent, or Firm* — Brian A. Collins; Charles R. Malandra, Jr.; Steven J. Shapiro

(57) ABSTRACT

A method of paying for postage stamps, that involves the generation of a plurality of postage stamps, wherein each of the stamps has a unique identification code; and the debiting of an account for the generation of the plurality of stamps when a carrier processes one of the plurality of stamps.

14 Claims, 3 Drawing Sheets

METHOD OF POSTAL PAYMENT FOR SET OF CUSTOMIZED POSTAGE

This Application claims the benefit of the filing date of U.S. Provisional Application No. 61/030,037 filed Feb. 20, 2008, which is owned by the assignee of the present Application.

FIELD OF THE INVENTION

The invention relates generally to the field of postage stamps and more particularly, to postage stamps having Information Based Indicia.

BACKGROUND OF THE INVENTION

It is a common practice throughout the world to use postage stamps as an indication that postage has been paid for the delivery of a mailpiece. These postage stamps are typically produced and issued by a government agency and procured for use by the general public. The postage stamps can either be obtained at a local post office or can be procured out of a postal vending machine. Moreover, for certain holidays or for certain special events the postal authority often produces a limited number of special edition or commemorative stamps which are distributed for sale and used for the payment of postage or alternatively are saved as a collector's item.

Post Offices have also found that it is desirable to permit a consumer to obtain a postage stamp which can be personally customized in appearance by the consumer.

Currently the United States Postal Services allows mailers to use their desktop computer and printer to apply postage in the form of an Information-Based Indicia (IBI) directly onto envelopes or labels while applying an address. The IBI consists of a two-dimensional bar code containing hundreds of bytes of information about the mail piece and certain human-readable information. The indicium includes a digital signature to preclude the forgery of indicia by unauthorized parties.

The IBI technology of the United States Postal Service (USPS) offers the postal customer a way to pay for postage without stamps. Envelopes are franked using the postal customer's personal computer, a Postal Security Device add-on, and the customer's printer. The Postal Security Device provides postal value storage and the link to the USPS and the manufacturer of the personal computer compatible add-on.

Presently, not every mailpiece is scanned by the USPS. Because of this, it is impossible to use the originator information in an IBI to charge the originator for the postage. The foregoing is one reason why the USPS requires the postage to be pre-paid before the mailpiece enters the mail stream.

At this time the USPS is interested in increasing their retail presence and availability of postal products. The USPS permits several different modes for paying for postage, which include postal indicia, permit mail, and stamps. None of the above is conducive to selling at a retail environment. Postal indicia require a meter that ties up funds in a prepaid account and produces a monochromatic imprint that is not considered appropriate for personal mail. Permit mail requires extensive processes for controlled acceptance and is even less appropriate for personal mail. Stamps are appropriate for personal mail, but since they are actual payment for postage, instead of evidence of payment like indicia or paid at controlled acceptance like permit mail, retailers do not like to use stamps. There are three issues which prevent retailers from carrying stamps: cost of inventory, risk of theft, and inventory can become outdated after postal rate changes.

Stamps tie up retailer funds in inventory and are perceived to be a primary target for theft since they equate to a cash value. Also, in order to have a diverse inventory of stamp pictures, even more stamps must be tied up in inventory. As a result, retailers often provide minimum service by only having one type of stamp (e.g. books of twenty standard 1-ounce rate flag stamps) to limit their inventory costs.

The risk of theft is another deterrent for retailers to carry stamps. Stolen stamps are still genuine postage and cannot be differentiated from stamps that were obtained legally. Therefore, they cannot be "deactivated" nor can they even be individually traced. To prevent theft, retailers often lock up their stamps in drawers under the supervision of cashiers. As a result, they miss an opportunity on the visual advertising aspects, of the impulse buyers, and other marketing techniques. Buyers are often not even aware that the store sells stamps unless they ask.

The final problem is that stamps lose their usefulness after a postal rate change. Forever stamps do not lose their usefulness after a rate change, but are only available in limited styles and application (e.g. one ounce first class rate). Stamps other than forever stamps (e.g. special value stamps or stamps with a vanity/special image) are still valid postage for the value indicated on the stamp, but very few people want to have to buy stamps with the "old rate" and buy "make-up rate" stamps in addition. The USPS position on this issue is that since it is still valid postage, they will not offer a refund. Therefore, the retailers will end up with undesired postage after a postal rate change and will also need to carry rate makeup stamps in addition.

Customized Postage, such as Pitney Bowes Stamp Expressions Sheet of Stamps product, is created with an Information Based Indicia (IBI) that has a unique identification (ID) consisting of the meter vendor ID, meter ID, and a piece count. This ID is unique and therefore individually identifiable. Since these stamps are created from a meter in a similar process as an indicium, the postal value has already been paid to the USPS, so it does not solve the problem of the retailer tying up funds in postage.

Other service providers, such as the prepaid phone card and gift card industries, have attempted to solve the problem of tying up retailer funds by activating the prepaid item at the point of sale terminal. However, this requires integration of the retailer's sales and inventory system with the service provider's Information Technology (IT) infrastructure. The integration can be complex and is not cost effective for low value items such as postage stamps.

SUMMARY OF THE INVENTION

This invention overcomes the disadvantages of the prior art by providing a method that enables the "pay upon use" payment for a set of multiple information-based indicia (IBI) postage (such as a sheet or booklet of Customized Postage Stamps) by charging for the entire set of postage the first time any one item of postage has been scanned by the USPS (or another postal authority). A set of postage may also be a box of envelopes with postage, a roll of postage, or even an arbitrary grouping of printed postage that may be divided prior to distribution. Even if only a fraction of stamps are scanned by postal processing equipment, the following demonstrates that at least one stamp from a set will probably be scanned. This enables proper payment of a set of postage stamps even if all stamps in the set are not scanned. There is a slight possibility that all of the Pay Upon Use (PUU) payment of postage in a set of stamps could be used with none of the stamps being scanned by the post. This probability decreases with an increased number of PUU postage stamps in a set and with an increase in the percentage of mailpieces with PUU stamps being successfully scanned.

The probability that at least one Pay Upon Use stamp in a set will be scanned is $1-(1-P)N$, where:

P=Ps*Pf=probability that a mailpiece having a PUU stamp is successfully scanned by the post
Ps=probability that a scan of a mailpiece having a PUU stamp is attempted by the post
Pf=probability that a scanned PUU stamp can be properly read (assuming no intentional defacing)
N=number of PUU stamps in a set For example, if the probability of a successful scan is 75% and there are 10 PUU stamps in a set, then the probability that at least one PUU stamp will be scanned is $1-(1-0.75)10$, or 99.9999%. Even if the probability of a scan is as low as 50%, the probability that at least one PUU stamp would be scanned is $1-(1-0.5)10$, or still over 99.9%.

However, for smaller numbers of PUU stamps in a set, this number can drop dramatically. If the probability of a successful scan is 75% and there are only 4 PUU stamps in a set, the probability that at least one PUU stamp would be scanned is $1-(1-0.75)4$, or only 99.6%. This means that the post would, on average, lose approximately 0.4% of their revenue from PUU stamps. This is still considerably lower than the cost the post incurs for the alternative of currently used postage stamps, which includes the cost of creating, distributing, storing, maintaining, and destroying the postage stamps.

The aforementioned probabilities could be used to determine an optimal mix between customer demand for smaller PUU set of stamps and the post's willingness to sacrifice a small amount of revenue to gain more retail penetration and displace costly postage stamps.

An advantage of this invention is that it permits proper PUU payment of all postage with the flexibility of not requiring every mailpiece to be scanned.

An additional advantage of this invention is that the Posts obtain proper payment of postage without the need to scan every mailpiece and gain greater penetration of postal products into the retail environment.

A further advantage of this invention is that the Posts are able to obtain another source of income through a wide range of specialized pictures on Customized Postage without having to sequester a large amount of cash in their postal product inventory.

A still further advantage of this invention is that mailers gain a greater variety of special postal products such as vanity stamps, special occasion stamps, special rate stamps (oversize, multiple ounces, and package) and only pay for postage when they start using the postal products.

DETAILED DESCRIPTION OF THE PREFERRED EMBODIMENT

Figure 1:
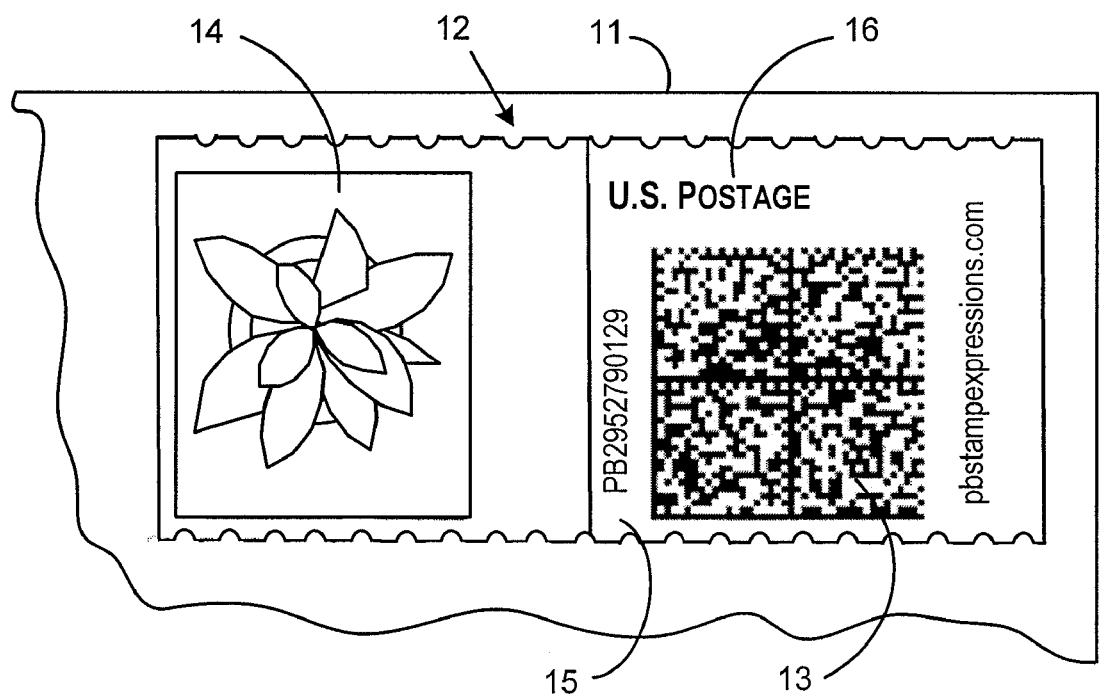
FIG. 1 is a drawing of a mailpiece having a customized stamp affixed thereto.

Referring now to the drawings in detail, and more particularly to FIG. 1, the reference character 11 represents a portion of a mailpiece, having a stamp 12 affixed thereto. Stamp 12 includes a Information Based Indicia (IBI), i.e., a two dimensional bar code 13. Stamp 12 may also include a customized stamp, i.e., a personalized picture, picture of noted personalities, natural scenes, artistic works, slogans, logos, etc. in area 14, a meter number 15 and the term U.S. Postage in space 16. Although this figure represents the stamp as Customized Postage, one skilled in the art will recognize that this invention may be applied to any set where the individual items or set of items can be uniquely identified.

Figure 2:
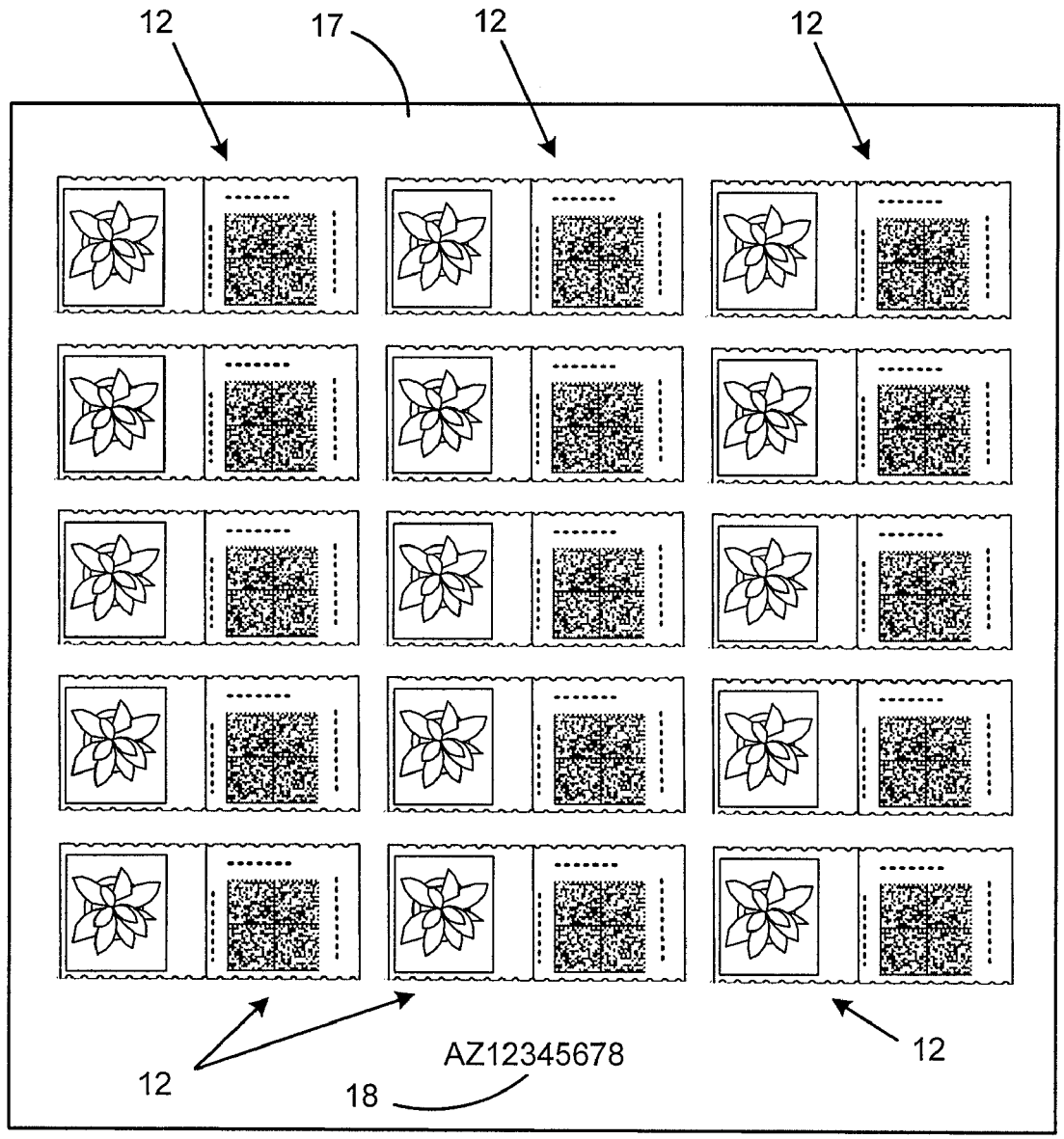
FIG. 2 is a drawing showing the customized stamp of FIG. 1, as one of a plurality of customized stamps on a sheet of stamps.

FIG. 2 is a drawing showing the customized stamp of FIG. 1, as one of a plurality of customized stamps on a sheet of stamps. Customized stamps 12 are arranged on a sheet 17 in a manner that stamps 12 may be removed from sheet 17 and still have enough adhesive to be affixed to a mail piece. Sheet 17 has a code 18 affixed thereto to uniquely identify the stamps 12 on sheet 17. Code 18 may be alphanumeric, glyphs, or a bar code or any combination of the foregoing. Sheet 17 may be combined with similar sheets 17 to make a booklet of stamps.

Figure 3:
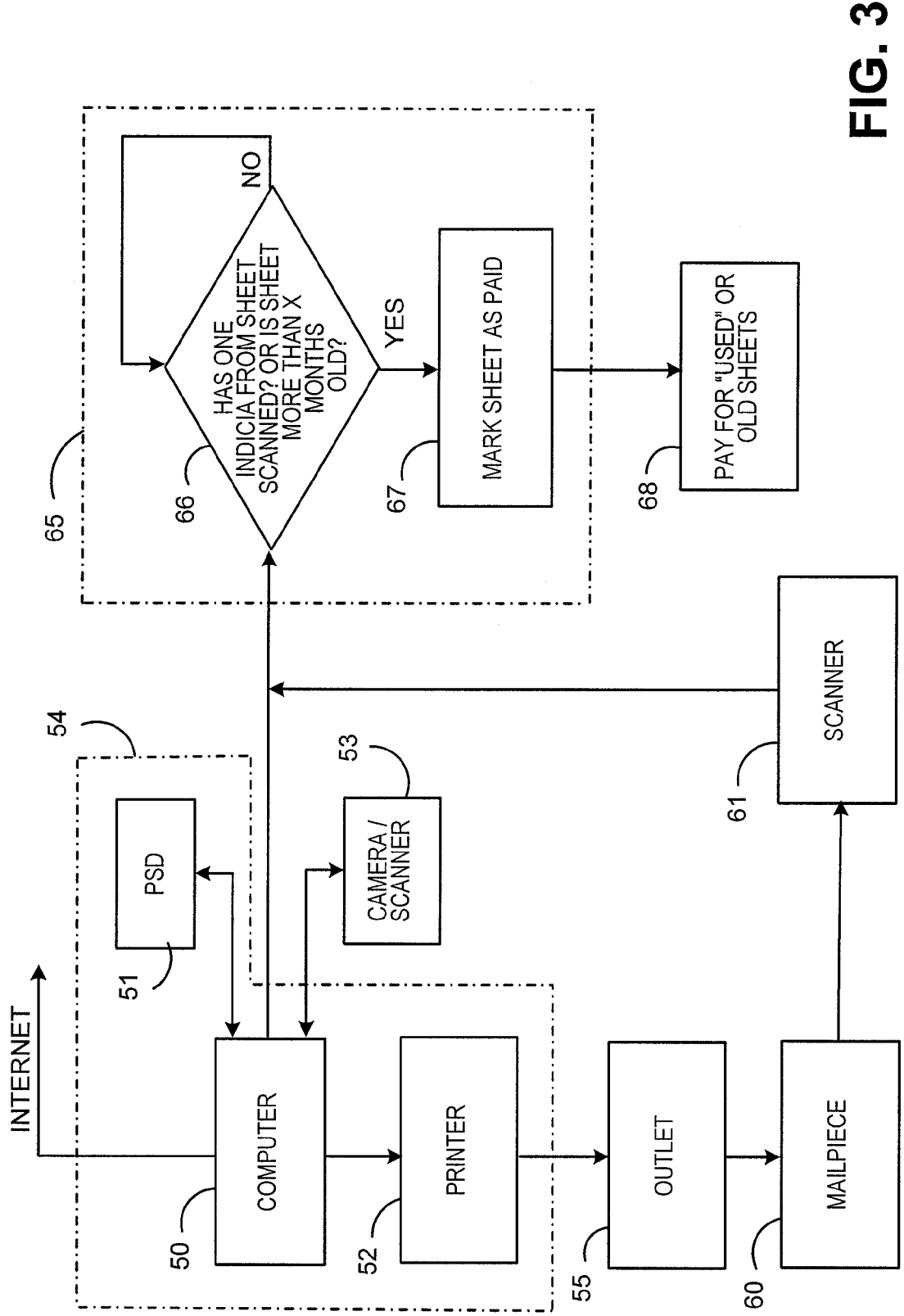
FIG. 3 is a diagram describing this invention.

FIG. 3 is a diagram describing this invention. The invention prints customized stamps 12 on individual adhesive labels, envelopes, sheets that form booklets, and/or on sheet 17 (FIG. 2), disposes of the stamps by sale or gift, distributes the stamps and accounts for their usage. A computer 50 (e.g. a personal computer or server) is coupled to a postal security device 51, a printer 52 and a scanner/camera 53. In the preferred embodiment computer 50, Postal Security Device (PSD) 51 and printer 52 comprise a customized metering system 54. It should be noted that PSD 51 may be a physical device, such as a Pitney Bowes Cygnus X-2 Postal Security Device or a virtual device such as the Pitney Bowes Clickstamp® Online postage metering service. Alternatively the functions of the PSD, creating the IBI barcode data and accounting for the total value of IBI created, could be performed totally in software on computer 50. It should also be understood that Computer 50, PSD 51, printer 52 and camera/scanner 53 may not be physically located in a single location, but may be otherwise connected, e.g., via networks, by transferring information using portable media, etc. In the preferred embodiment, computer 50 is connected to the Internet to facilitate communication with postal authorities and financial institutions for the management of postal funds. Personalized pictures, pictures of noted personalities, natural scenes, artistic works, slogans, logos, etc. are entered into computer 50 via scanner/camera 53 or loaded into computer 50 via the internet or transferred to computer 50 using other suitable networks or portable media. Computer 50 requests and receives IBI data from PSD 51 which accounts for the creation of the IBI data. Computer 50 combines one or more pictures and multiple IBI to create sets of PUU postage which are printed by printer 52 on media (e.g., labels, envelopes, paper, etc.) for the formation of customized stamps.

Metering system 54 produces one or more customized stamps 12, which may be an individual stamp 12, or a set of stamps contained in a sheet 17 or one or more sheets 17 combined to form a booklet. The unique number contained in IBI 13 on stamp 12, the code 18 that identifies each stamp 12 on sheet 17 and other relevant information will be transmitted and stored in a memory in computer 65. Relevant information may include: the date of stamp creation, the intended distributor of the set (e.g., a retail outlet), etc. It should be noted that computer 65 need not be separate from computer 50. Meter 54 may be located at a central production site, a retail establishment, an office or home. The Posts may charge additional funds for the production and/or use of customized stamps 12. Printer 52 may produce stamps 12 in color or monochrome on various types of paper known in the art.

If meter 54 is not located at a retail establishment, stamps 12 are distributed to retail outlet 55. A customer purchases a sheet of stamps 17 at retail outlet 55 and affixes one or more stamps 12 to mailpiece 60 and then mails mailpiece 60. After mailing, a postal scanner 61 reads IBI 13 from stamp 12 and transmits the information contained in IBI 13 to a database contained in computer 65. Computer 65 determines in step 66 whether or not an indicia 13, contained in a stamp 12 on sheet 17 has been previously scanned or if more than a predetermined period of time, e.g., 90 days, has passed since a certain event for stamps 12 on sheet 17. The event could be any particular event related to the sheet 17, such as the date of creation of the indicia 13, the date of the printing of the sheet 17, the date of distribution to the outlet 55, or the date of the purchase from the outlet 55. If computer 65 determines that an indicia 13 contained in a stamp 12 on sheet 17 has been previously scanned or if more than the predetermined period of time has passed since an event for the stamps 12 on sheet 17, computer 65 will mark sheet 17 as paid in step 67. In step 68, the postal processor is paid for the postage value of sheet 17 using, for example, a postage meter account, electronic file transfer of funds between banking accounts, or other funds transfer method. While scanning and payment has been described with respect to a sheet 17 it will be understood a set of stamps may be formed as a set of envelopes, sheets, etc. It should be noted that steps 66 through 68 may be performed in real-time or as a batch. Therefore, payment 68 may be made for individual sets of postage or as an aggregate for all sets of postage processed over a period of time, for example daily.

The above specification describes a new and improved method of paying for postage stamps. It is realized that the above description may indicate to those skilled in the art additional ways in which the principles of this invention may be used without departing from the spirit. Therefore, it is intended that this invention be limited only by the scope of the appended claims.

What is claimed is:

1. A method of paying for postage stamps, comprising the steps of:
   generating a plurality of postage stamps, using a supplier processor, wherein each of the stamps has a postage value and a unique identification code which is indicative of the value of the plurality of stamps; and
   debiting an account, using a carrier processor for the value of the plurality of stamps when a carrier identifies one of the plurality of stamps using the unique identification code.

2. The method claimed in claim 1, wherein the unique identification code is an Information Based Indicia.

3. The method claimed in claim 2, wherein the Information Based Indicia includes a meter number.

4. The method claimed in claim 2, wherein the Information Based Indicia includes a user number.

5. The method claimed in claim 2, wherein the Information Based Indicia includes a piece count.

6. The method claimed in claim 1, wherein the postage stamps are customized.

7. The method claimed in claim 1, wherein the account is contained in a meter.

8. The method claimed in claim 1, further including the step of:
   debiting the account that generated the plurality of stamps after a predetermined length of time if the carrier has not processed one of the plurality of stamps.

9. The method claimed in claim 8, wherein the predetermined length of time begins when the plurality of stamps have been sold.

10. The method claimed in claim 8, wherein the predetermined length of time begins when the plurality of stamps have been generated.

11. The method claimed in claim 1, wherein the plurality of postage stamps, have different values.

12. The method claimed in claim 1, wherein the plurality of postage stamps, are first class stamps.

13. The method claimed in claim 1, wherein the plurality of postage stamps, are forever stamps.

14. A postage stamp payment system, comprising:
   a supplier processor that generates a plurality of postage stamps, wherein each of the stamps has a postage value and a unique identification code which is indicative of the value of the plurality of stamps; and
   a carrier processor that debits an account for the postage value of the plurality of stamps when a carrier identifies one of the plurality of stamps using the unique identification code.

* * * * *